United States Patent [19]

Passarelli et al.

[11] Patent Number: 4,710,272

[45] Date of Patent: Dec. 1, 1987

[54] DISTILLING APPARATUS

[76] Inventors: Frank J. Passarelli, 1728 Kelton Ave., Los Angeles, Calif. 90024; George A. Matsukas, 1834 W. Hiway 154, Santa Ynez, Calif. 93460; Charles P. Caspary, 21524 Nordhoff St., Chatsworth, Calif. 91311

[21] Appl. No.: 841,803

[22] Filed: Mar. 20, 1986

Related U.S. Application Data

[63] Continuation-in-part of Ser. No. 700,976, Feb. 12, 1985, abandoned, which is a continuation-in-part of Ser. No. 476,582, Mar. 18, 1983, abandoned.

[51] Int. Cl.$^4$ .......................... B01D 3/04; B01D 3/10
[52] U.S. Cl. ..................... 202/205; 202/235; 202/237; 203/11; 203/24; 203/91; 203/DIG 8; 203/DIG. 17; 159/24.3; 159/27.1; 159/DIG. 16; 159/DIG. 32
[58] Field of Search ............... 159/24.3, 27.1, 23, 159/DIG. 16, DIG. 32, 24.2, 26.1; 202/237, 205, 235, 254, 257; 203/24, 91, DIG. 8, 10, 11, DIG. 17

[56] References Cited

U.S. PATENT DOCUMENTS

| | | | |
|---|---|---|---|
| 2,469,122 | 5/1949 | Latham, Jr. | 203/26 |
| 2,584,357 | 2/1952 | Loebel | 203/26 |
| 2,696,465 | 12/1954 | Kittredge | 203/24 |
| 3,136,707 | 6/1964 | Hickman | 202/205 |
| 3,183,174 | 5/1965 | Williamson | 159/24.3 |
| 3,190,817 | 6/1965 | Neugebauer et al. | 203/26 |
| 3,393,131 | 7/1968 | McIntyre, Jr. | 202/190 |
| 3,494,835 | 2/1970 | Mahistre | 203/26 |
| 3,575,814 | 4/1971 | Bahrenburg | 202/172 |
| 3,580,817 | 5/1971 | Schnur | 203/24 |
| 3,725,209 | 4/1973 | Rosa | 203/24 |
| 3,838,016 | 9/1974 | Powers | 202/83 |
| 3,935,077 | 1/1976 | Dennison | 202/83 |
| 3,957,589 | 5/1976 | Mayer | 202/190 |
| 4,052,267 | 10/1977 | McFee | 202/190 |
| 4,269,663 | 5/1981 | McFee | 202/83 |
| 4,304,637 | 12/1981 | Robbins | 202/180 |
| 4,326,923 | 4/1982 | Mortenson | 202/234 |
| 4,342,623 | 8/1982 | Loeffler | 202/83 |

Primary Examiner—S. Leon Bashore
Assistant Examiner—V. Manoharan
Attorney, Agent, or Firm—Jack C. Munro

[57] ABSTRACT

An apparatus for distilling a source liquid which utilizes a substantially vertical liquid column. The liquid column is contained by a tubular container closed at the top and open at the bottom. The open bottom of the tubular container is submerged within a source liquid reservoir. The height of the tubular container is greater than the maximum obtainable height for the given density of the portion of source liquid contained within the column. A vacuum is located within the tubular container above the surface of the portion of source liquid contained in the column. In the area of the vacuum, there is located a centrifugal compressor which is to function to move vapor from the vacuum section of the tubular container and compress such along with the transfer of heat to the point that the vapor becomes liquid. This now product liquid is to be removed from the apparatus.

4 Claims, 3 Drawing Figures

DISTILLING APPARATUS

BACKGROUND OF THE INVENTION

Reference to Prior Application

This application is a continuation-in-part of patent application Ser. No. 700,976, filed Feb. 12, 1985, entitled Improved Distilling Apparatus, now abandoned which is a continuation-in-part of patent application Ser. No. 476,582, filed Mar. 18, 1983, now abandoned.

It is known that vapor compression provides an efficient means for evaporation for the desalination of sea water and brackish water. In the past, desalination systems have at the best obtained efficiencies in the range of sixty to seventy-five percent. If this efficiency can be increased to eighty-five to ninety percent, the cost for the desalination for an acre foot of water is significantly decreased.

The first vapor compression evaporators using mechanical compressors were built in Europe about 100 years ago. Since that time, thousands of mechanical vapor compression evaporators have been put into service around the world for desalting sea water and brackish water. Several hundred evaporators have been installed in the chemical process industries to concentrate solutions ranging from inorganic chemicals to temperature sensitive food products. The primary advantage of mechanical vapor compression evaporation over conventional single or multi-effect arrangements is far lower energy consumption. The price of oil and other energy sources in the past have been an increasing incentive to investigate vapor compression evaporation as a means of reducing energy usage and the energy contribution to product costs.

It is well known that liquid will stand freely within a vertical column, with the bottom of the column being open in a reservoir of the liquid and the top of the column being exposed to a vacuum. The free standing of the vertical column has to do with the air pressure being applied to the surface of the liquid reservoir. The density of the liquid determines the height of the standing of the liquid. For example, mercury will stand thirty inches. Similarly, a column of fresh water will stand approximately thirty-four feet. A column of salt water will stand approximately thirty-three feet, since the salt water is of a slightly greater density than the fresh water. Vapor of the liquid is collected in the vacuum located above the free standing column of liquid. In essence, the upper surface of the liquid boils.

SUMMARY OF THE INVENTION

The primary objective of this invention is to construct a distilling apparatus which extracts the vapor from the vacuum which is confined in the space above a free standing column of liquid and condense that vapor into a product liquid.

Another objective of this invention is to utilize a distilling apparatus where the distillation can be achieved with minimum use of spent energy. Such a distillation apparatus can be quite useful, for example, in the desalination of sea water.

The lack of fresh water in many communities is well known. Many of these communities are very near an ocean and therefore, if an extremely energy efficient structure could be utilized to produce fast quantities of fresh water, then such a structure would be highly advantageous.

The structural arrangement of this invention will be discussed primarily in conjunction with sea water and fresh water. However, it is considered to be within the scope of this invention that the invention could be utilized with distilled liquids other than water.

The structure of the present invention utilizes a tubular container which is disposed vertically having a closed top and an open bottom. The height of the container is greater than the particularly selected liquid which is located within the container in a free standing manner with a vacuum located between the surface of the liquid and the top of the container. The bottom of the container is to be submerged within a reservoir of source liquid, such as the ocean. Positioned near the surface of the source liquid in the container is a centrifugal compressor. The inlet of the compressor is located within the vacuum section of the container. The outlet of the compressor is within a product liquid collecting chamber which is separated from the source liquid. The centrifugal compressor draws the vapor located within the vacuum section and compresses such which, along with the transfer of heat, causes such to condense. The condensed (product) liquid is deposited within the product liquid collecting chamber then removed from the distilling apparatus. Heat is generated during this condensing of the product liquid. This heat is to be absorbed by a mass of tubes within which the source liquid to be distilled is located. This absorbtion of heat furthers the distilling process. These tubes pass through the product liquid collecting chamber with the lower open end of these tubes connecting only with the source liquid and the upper open end of these tubes connecting only with the vapor collection chamber of the container. Fluid conductance is prevented directly between the tubes and the product liquid collecting chamber. The surface of the source liquid moves within these tubes between the lower open end and the upper open end.

DETAILED DESCRIPTION OF THE SHOWN EMBODIMENT

Figure 1:
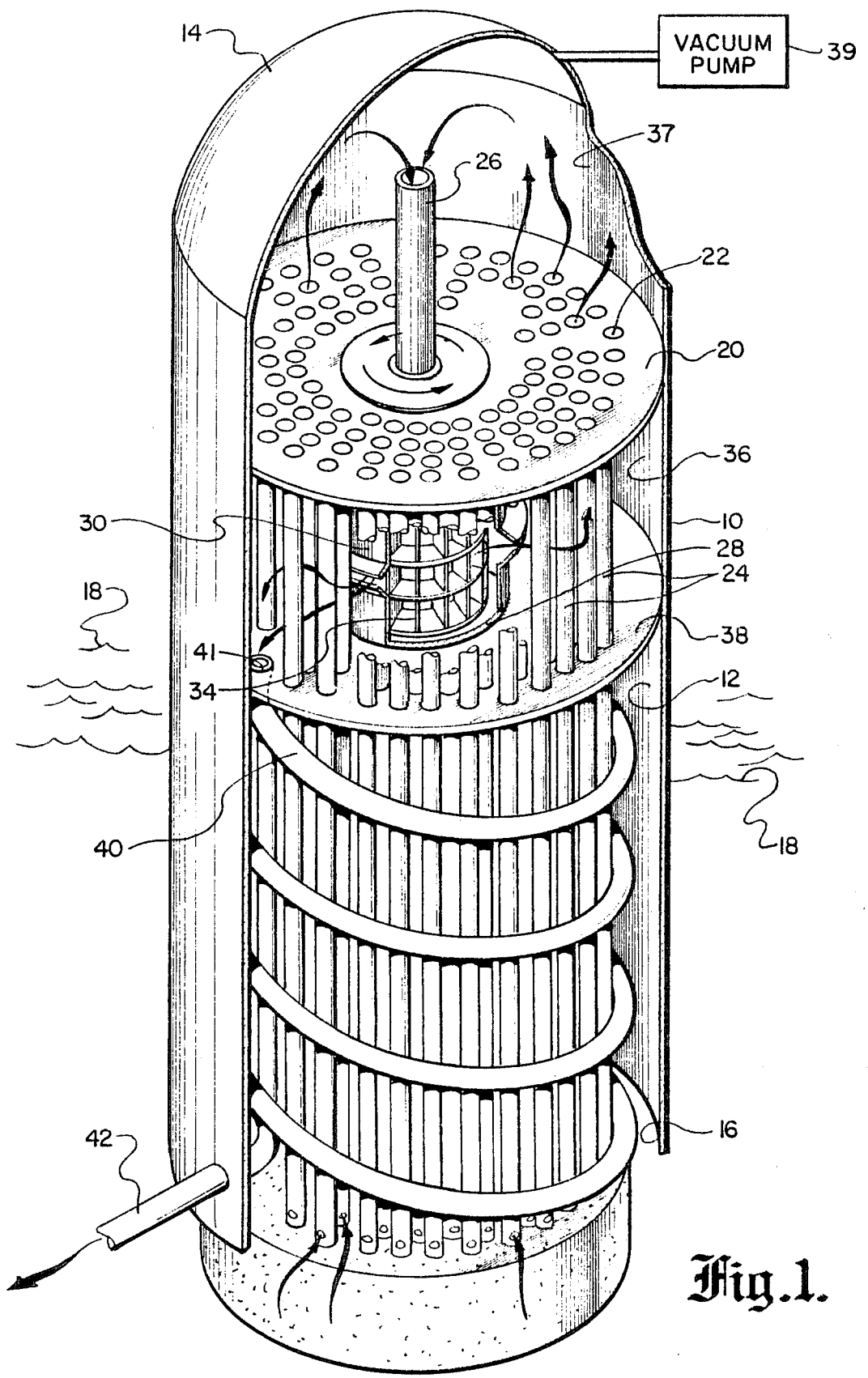
FIG. 1 is an isometric view, partly cut-away, showing the distilling apparatus of the present invention.
Figure 2:
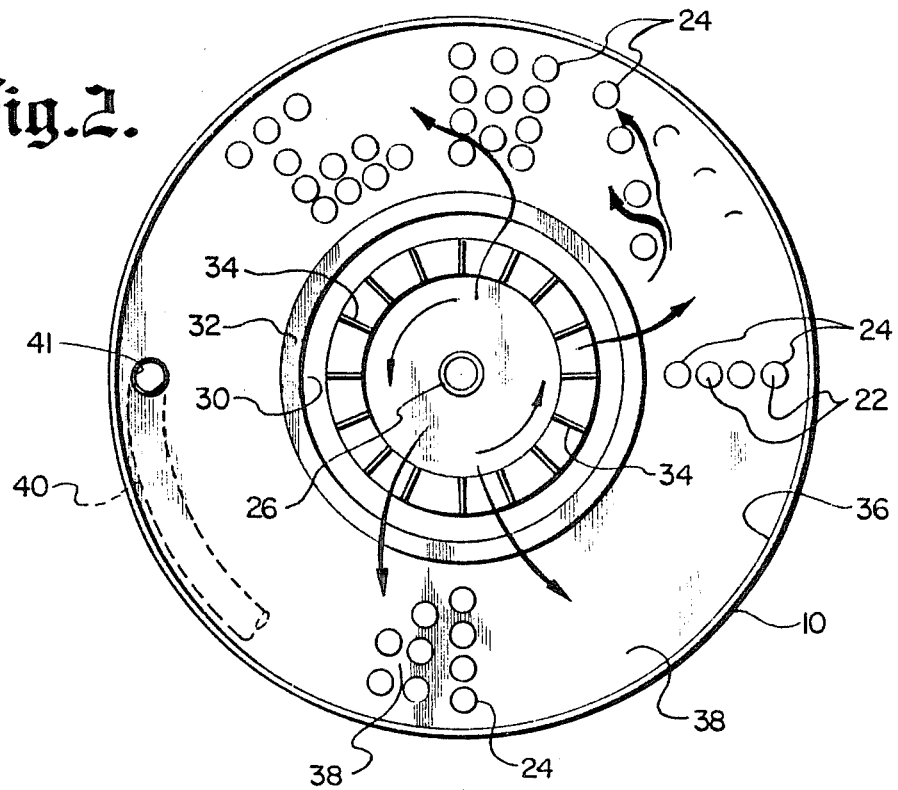
FIG. 2 is a horizontal cross-sectional view taken through the centrifugal compressor utilized in conjunction with the distilling apparatus of this invention.
Figure 3:
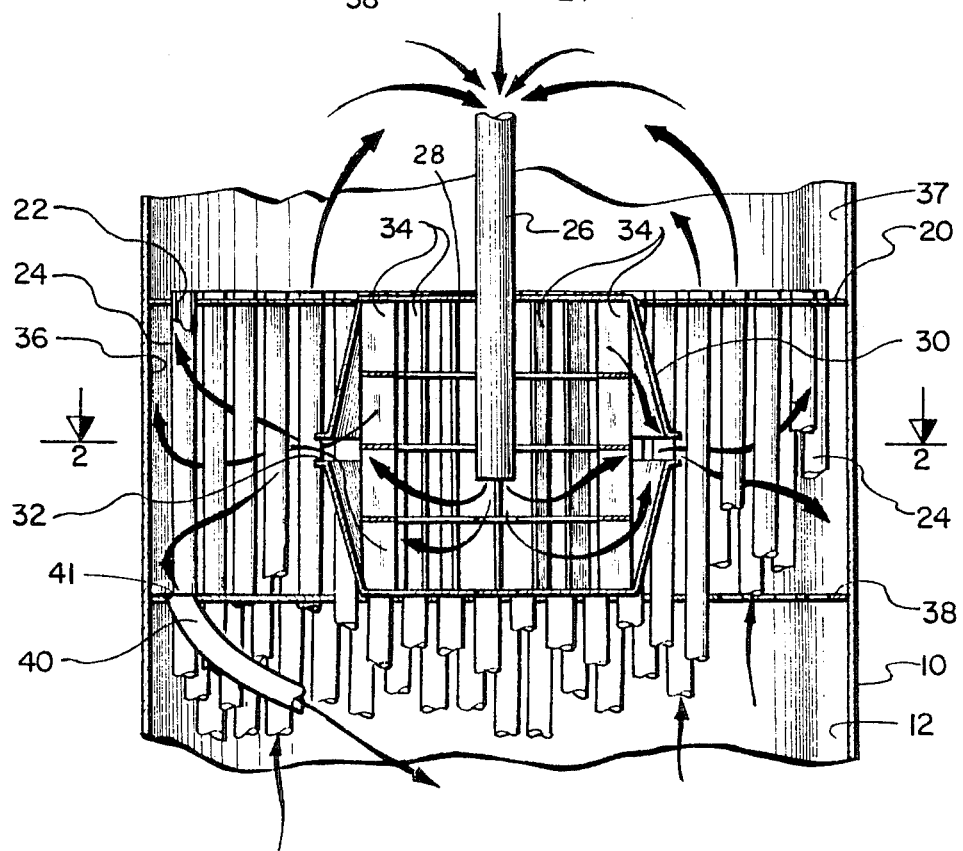
FIG. 3 is a vertical cross-sectional view through the centrifugal compressor.

Referring particularly to the drawings, there is shown a vertical, thin walled container 10 which will normally be constructed in a tubular configuration having an internal chamber 12. The longitudinal center axis of the container is substantially vertically disposed. A typical material of construction for the container 10 would be a metal, such as steel.

The top of the container 10 is closed by means of an end wall 14. The bottom is open forming an access opening 16. The access opening 16 is to be submerged under the surface (horizontally disposed) of a source liquid 18. A typical source liquid 18 would be sea water or other non-consumable water. It is understood that the container 10 will be supported by some structure (not shown) at the desired position within the source liquid 18.

The internal chamber 12 is divided into an upper section and a lower section. The upper section is located between the closed end 14 and plate 38 and the lower section is located between plate 38 and the source liquid 18. The lower section forms a reservoir for the source liquid 18. The upper section forms a vapor collecting chamber 37 at the very top of container 10 plus a product liquid chamber 36. The product liquid chamber 36 is located between the plate 20 and plate 38. The plate 20 functions to separate and prevent direct intermixing of the vapor contained within the vapor collecting chamber 37 and the product liquid chamber 36. The connection between the vapor collecting chamber 37 and the product liquid chamber 36 will be explained further on in this specification.

If the source liquid 18 is sea water, the surface of the source liquid 18 within the internal chamber 12 would be approximately thirty-three feet in height. The plate 38 will be positioned at this approximate level, maybe slightly above, such at thirty-four feet. The plates 20 and 38 will be constructed normally of a corrosion resistant metal, such as stainless steel. The periphery of the plates 20 and 38 will be integrally secured to the wall of the internal chamber 12.

A vacuum will be drawn within the vapor collecting chamber 37 such as by a vacuum pump 29. Once drawn to a predetermined amount, the vacuum pump will be deactivated. The vacuum pump 29 will also be used to discharge to the ambient all non-condensable gases which have accumulated in the upper portion of the vapor collecting chamber 37. The vacuum pump 29 will be operated sporadically. The vacuum pump 29 will be activated when the level of source liquid in the conduits 24 and reservoir located in the lower portion of internal chamber 12 falls below a certain level (such as an alignment with plate 38). The vacuum pump 29 will operate until the level of source liquid rises to some higher level (such as in alignment with plate 20). The source liquid 18 will freely flow into conduits 24 and reservoir located in the lower portion of internal chamber 12. For example, if the source liquid falls to thirty feet in height, the vacuum pump 29 will start. The vacuum pump 29 will continue to operate until the level of source liquid rises to thirty-three feet at which time the vacuum pump 29 will be turned off. The vacuum pump 29 will automatically restart when the level of source liquid falls to thirty feet.

It is to be noted that initially the vacuum pump 29 will be operated for an extended period of time for the source liquid to rise the level of thirty-three feet.

Formed within the plate 20 are a mass of spaced-apart openings 22. Mounted within each opening in a fluid-tight manner is a conduit 24. It is to be understood that there is a rather large number of the conduits 24. The conduits 24 will normally extend the entire length of the lower section of the chamber 12. Each conduit 24 will have an opening at its lowermost end through which the source liquid is to be conducted.

Centrally mounted in an appropriate opening within the plate 20 is an inlet conduit 26. The open end of the inlet conduit 26 connects with the vapor collecting chamber 27. The outlet portion of the conduit 26 extends within a compressor housing 28. The compressor housing 28 includes a side wall 30 which includes an annular opening 32. Rotatably mounted within the housing 28 is a series of vanes referred to as a vane assembly 34. The vane assembly 34 is to include a series of pockets which are open in their radially outward side, with their radially inward side connecting with the inner end of the conduit 26. The compressor housing 28 is mounted within product liquid chamber 36. Although conduits 24 pass through product liquid chamber 36, the conduits 24 are open (at their top) only to vapor collecting chamber 37.

Vapor will be emitted (or released) from the source liquid contained in the conduits 24. This vapor is to be drawn by suction through the portion of conduits 24 that extend between plates 20 and 38 (product liquid chamber 36) into the vapor collecting chamber 37. The vapor is then drawn into the conduit 26 due to rotation of the vane assembly 34. The vane assembly 34 is to be rotated by conventional means such as an electric motor (not shown). The vane assembly 34 is mounted within the housing 28. The motor could be connected to conduit 26 and located within vapor collecting chamber 37. Vane assembly 34 could be mounted on conduit 26. The motor could then rotate conduit 26 which would then rotate vane assembly 34. The vapor is then forcibly moved in a centrifugally outward direction against the interior of the side wall 30. This causes the vapor to become significantly compressed. This compressed vapor is discharge through the annular opening 32 and confined by the product liquid chamber 36. The vapor rises in temperature. The heat is absorbed by the conduits 24 thereby assisting in the complete vaporization of the feed liquid contained within the conduits 24. The loss of heat by the compressed vapor assists in condensing of the vapor into the product liquid.

The product liquid is permitted to collect on upper surface of plate 38. Plate 38 is similar to plate 22 but located in a parallel spaced relation therefrom within the upper section of the internal chamber 12. Plate 38 forms the dividing line between the upper section and the lower section. The plate 38 functions to separate the product liquid chamber 36 and the vapor collecting chamber 37 from the lower portion of the internal chamber 12 not permitting contamination of the liquids contained therebetween. A discharge conduit 40 is mounted within an opening 41 formed within the plate 38. The conduit 40 connects with the product liquid chamber 36. The discharge conduit 40 is wound in a helical manner through the lower section of the chamber 12 and then finally exiting through the wall of container 10 at an exit conduit 42. distilled water from the exit conduit 42 will be deposited at an appropriate collecting reservoir (not shown). The vacuum is to be maintained through the conduits 40 and 42. Any excess heat within the discharge conduit 40 is absorbed by the source liquid contained within the lower section of the chamber 12 and hence into the source liquid contained within conduits 24.

The actual construction of the centrifugal compressor, which is shown generally as conduit 26, housing 28, side wall 30, opening 32 and vane assembly 34, can be altered as desired without departing from the scope of this invention.

What is claimed is:

1. In combination with a means defining a source of non-consumable water, a distilling apparatus connecting with said means, said distilling apparatus comprising:

a tubular container having a longitudinal center axis, said longitudinal center axis being substantially vertical, said tubular container having a top and a bottom, said top being closed, said bottom being open, said bottom being submerged beneath the surface of the source, said container defining an upper section and a lower section;

means for drawing vacuum within said upper section, a reservoir formed within said lower section, wherein a portion of said source flows into said reservoir comprising a free standing vertical column within said reservoir, said portion of said source having a surface exposed to vacuum, whereby vapor is released from said surface;

a vapor collecting chamber and a product liquid collecting chamber located within said upper section, said product liquid collecting chamber being located between said vapor collecting chamber and said reservoir;

a first conduit means passing through the product liquid collecting chamber with the upper open end connected with said vapor collecting chamber and the lower open end connected with said reservoir, said first conduit means for moving the vapor into said vapor collecting chamber heat produced during condensation of the vapor within said product liquid collecting chamber being conducted into said first conduit means;

compressor means mounted within said product liquid collecting chamber, said compressor means having an inlet connected to a second conduit means and an outlet connect with said product liquid collecting chamber, said second conduit means having an inlet connected to the vapor collecting chamber and an outlet connected to the compressor, said compressor means for extracting the vapor from said vapor collecting chamber and compressing ssaid vapor facilitating condensation of the vapor into product liquid; and discharge means connected to said product liquid collecting chamber for conducting said product liquid exteriorly of said product liquid collecting chamber, whereby said product liquid is removed from said product liquid collecting chamber and additional non-consumable water of said source automatically flows into said reservoir maintaining said source at said free standing vertical column.

2. The combination as defined in claim 1 wherein:
said first conduit means comprises a plurality of spaced-apart conduits.

3. The combination as defined in claim 2 wherein:
said compressor means comprising a centrifugal compressor, said centrifugal compressor having a rotatable vane assembly, said rotatable vane assembly to move said vapor from said vapor collecting chamber centrifugally outward to compress said vapor.

4. The combination as defined in claim 3 wherein:
said centrifugal compressor including an exterior housing, said exterior housing having an annular outlet opening, the compressed said vapor is to be conducted through the annular outlet opening into said product liquid collecting chamber.

* * * * *